United States Patent
Murphy et al.

(10) Patent No.: US 9,325,518 B2
(45) Date of Patent: Apr. 26, 2016

(54) CONTROLLING A DEVICE OF A REMOTE NETWORK FROM A LOCAL NETWORK

(75) Inventors: Vincent Murphy, Toulouse (FR);
Roberto Agro, Bourg la Reine (FR)

(73) Assignee: FRANCE TELECOM, Paris (FR)

( * ) Notice: Subject to any disclaimer, the term of this patent is extended or adjusted under 35 U.S.C. 154(b) by 400 days.

(21) Appl. No.: 13/582,656

(22) PCT Filed: Mar. 3, 2011

(86) PCT No.: PCT/FR2011/050450
§ 371 (c)(1),
(2), (4) Date: Sep. 4, 2012

(87) PCT Pub. No.: WO2011/107717
PCT Pub. Date: Sep. 9, 2011

(65) Prior Publication Data
US 2013/0003749 A1 Jan. 3, 2013

(30) Foreign Application Priority Data
Mar. 3, 2010 (FR) ...................................... 10 51521

(51) Int. Cl.
*H04L 12/28* (2006.01)

(52) U.S. Cl.
CPC ......... *H04L 12/2818* (2013.01); *H04L 12/2834* (2013.01); *H04L 2012/2849* (2013.01); *H04L 2212/00* (2013.01); *H04L 2212/0025* (2013.01)

(58) Field of Classification Search
None
See application file for complete search history.

(56) References Cited

U.S. PATENT DOCUMENTS

| 7,921,194 | B2 * | 4/2011 | Song et al. | 709/223 |
| 8,024,429 | B2 * | 9/2011 | Cagenius | 709/219 |
| 8,127,028 | B2 * | 2/2012 | Skog et al. | 709/228 |
| 8,180,904 | B1 * | 5/2012 | Albanese et al. | 709/228 |
| 2005/0232283 | A1 * | 10/2005 | Moyer et al. | 370/401 |
| 2009/0080453 | A1 * | 3/2009 | Stirbu | 370/433 |
| 2009/0252063 | A1 * | 10/2009 | Owen et al. | 370/255 |

(Continued)

FOREIGN PATENT DOCUMENTS

| EP | 2124389 A2 | 11/2009 |
| GB | 2445791 A | 7/2008 |

OTHER PUBLICATIONS

International Search Report and Written Opinion dated Jul. 15, 2011 for corresponding International Application No. PCT/FR2011/050450, filed Mar. 3, 2011.

(Continued)

*Primary Examiner* — Hicham Foud
(74) *Attorney, Agent, or Firm* — David D. Brush; Westman, Champlin & Koehler, P.A.

(57) ABSTRACT

A method and apparatus are provided for controlling at least one UPnP device of a remote network from a local network by a local relay module of the local network, which is able to communicate with at least one remote relay module of a remote network. The relay module obtains, via the remote relay module, at least one identifier of a UPnP device detected in the remote network by a UPnP monitoring point associated with this remote relay module, and records at least one identifier received in association with identification data of the remote relay module having provided this identifier. The relay module controls a UPnP device of the remote network by way of the monitoring point associated with the remote relay module, identified by the identification data recorded in association with an identifier of this UPnP device.

12 Claims, 10 Drawing Sheets

(56) References Cited

U.S. PATENT DOCUMENTS

2010/0191829 A1* 7/2010 Cagenius .................. 709/219
2011/0002341 A1* 1/2011 Damola et al. ............. 370/401

OTHER PUBLICATIONS

Hillen B. et al. " Remote Management of Non-TR-069 UPnP End-User Devices in a Private Network", Consumer Communications and Networking Conference, 2009. CCNC 2009. 6th IEEE, IEEE, Piscataway, NJ, USA, Jan. 10, 2009, pp. 1-2, XP031425716.
International Preliminary Report on Patentability and English translation of the Written Opinion dated Sep. 18, 2012 for corresponding International Application No. PCT/FR2011/050450, filed Mar. 3, 2011.

* cited by examiner

CONTROLLING A DEVICE OF A REMOTE NETWORK FROM A LOCAL NETWORK

CROSS-REFERENCE TO RELATED APPLICATIONS

This Application is a Section 371 National Stage Application of International Application No. PCT/FR2011/050450, filed Mar. 3, 2011, which is incorporated by reference in its entirety and published as WO 2011/107717 on Sep. 9, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates in general to telecommunication techniques and more particularly to the control of a device of a remote network from a local network.

BACKGROUND OF THE DISCLOSURE

Various known technologies are used to establish a connection from one network to another for the purpose, for example, of commanding a remote network entity from a local network; for example, VPN (Virtual Private Network) secure tunnels. Another solution that is widely used consists in making use of an IMS (IP Multimedia Subsystem) architecture.

These existing VPN tunnel or IMS architecture-based solutions are relatively costly and complex to apply. Moreover, with VPN tunnel-based solutions, address-conflict problems arise. IMS architectures are not necessarily made freely available to users of the mass market.

In the mass-market field, the UPnP/DLNA standard takes precedence as a standard for the sharing, broadcasting and controlling of digital contents. Today, various items of equipment complying the UPnP (Universal Plug and Play) standard are spread throughout homes and in particular in the multimedia field with media servers (called for example Twonky-Media, Windows Media Player 11, etc.), media renderers (STB, DMA audio, IP-Radio, etc.) and media players (games consoles, digital photo frames, etc.).

However, the items of equipment of one UPnP network are not designed to communicate with an item of equipment of another UPnP network. Specifically, there is no solution in the UPnP standard for remotely controlling this entity. Specifically, the mechanism for discovering UPnP entities uses a command transmitter in "multicast" mode which makes it possible to discover only entities that are present in a local network and not those present in a remote network.

There is therefore a need for a simple solution for controlling, from a local network, the entities of a remote network, a solution that would be suitable for remotely controlling an entity in the form of UPnP device.

SUMMARY

According to a first aspect, an embodiment of the invention relates to a method for controlling, from a first network, called a local network, at least one UPnP device of a remote network, the method being implemented by a first relay module of the first network, configured to communicate with at least a second relay module of a remote network, the method comprising:

a step of obtaining, via a said second relay module, at least one identifier of a UPnP device detected in one said remote network by a UPnP control point associated with said second relay module;

a step of recording at least one identifier received in association with identification data of the second relay module that has supplied said at least one identifier;

a step of controlling a UPnP device of said remote network through the control point associated with the second relay module, identified by the identification data recorded in association with an identifier of this UPnP device.

An embodiment of the invention therefore provides a mechanism for communication between a local network and a remote network, based on the use of relay modules located respectively in the local network and in the remote network, which are each designed to communicate with one another and to supply a list of identifiers of devices that may be controlled through them.

In particular, the storage, by a local relay module, of one of these identifiers in association with identification data of the relay module able to control the device identified by this identifier makes it possible to subsequently send a request to this device through the relay module concerned and through the control point associated with this concerned relay module.

This method of remotely controlling a UPnP device through a control point that is present in the same network as this UPnP device is applicable to any UPnP device of this network that has been detected by the UPnP control point. Consequently, a single relay module associated with a control point is sufficient in each network to make it possible to remotely control all the UPnP devices of the network.

Moreover, not only the identifiers but also the information describing the UPnP devices of the remote network that are collected during the discovery phase used according to the UPnP/DLNA standard by the control point can be used directly by the relay module of the local network in order to remotely control these UPnP devices. No additional discovery phase is to be used to obtain this information.

According to one embodiment, the method also comprises:
a step of sending a request to a second UPnP device of the remote network through the second relay module identified by the recorded identification data in association with an identifier of said UPnP device;
a step of receiving, through said second relay module, a response to said request from the second UPnP device.

The local relay module communicates with the UPnP entities of the remote network through the remote relay module both for the sending of requests and for receiving the responses to these requests. The remote relay module, interacting with the local relay module, constitutes a representative entity (or "proxy" according to Anglo-Saxon terminology), serving as a representative, notably with respect to the local relay module, of the UPnP devices of the remote network.

According to another embodiment, the method also comprises:
a step of receiving, through the second relay module, a request intended for a UPnP device of the local network,
a step of transmitting said request to the concerned UPnP device;

a step of transmitting, to said second relay module, a response to said request constructed from the response supplied by the UPnP device concerned.

The remote relay module communicates with the UPnP entities of the local network through the local relay module both for sending requests and for receiving the responses to these requests. The local relay module, interacting with the remote relay module constitutes a representative entity (or "proxy" according to Anglo-Saxon terminology), serving as a representative, notably with respect to the remote relay module, of the UPnP devices of the local network that are not able to communicate with an entity outside this local network and/or a non-UPnP entity.

According to another embodiment, the method also comprises a step of recording, for at least one said second relay module, data representing an authorization to or prohibition from responding to a request originating from this second relay module. This makes it possible to protect the interchanges made between the local relay module and the remote relay modules, in that the local relay module will be able to transmit responses only to the known remote relay modules for which it has a response authorization.

According to another embodiment, the method also comprises, when a request or a response to a request, intended to be transmitted by the first relay module to one said second relay module, comprises an address of a content referenced by a content server of the local network, a step of converting this address into a converted address designating an interconnection module of a gateway for access to the local network as the entity from which this content is available. This has the effect of preventing address conflicts that may occur because of the sharing of contents referenced in a remote network with the entities of the local network.

According to another embodiment, the method also comprises, when a request or a response to a request, received by the first relay module and originating from one said second relay module, comprises an address of a content referenced by a content server of the remote network, a step of converting this address into a converted address designating an interconnection module of a gateway for access to the local network as the entity from which this content is available. This has the effect of preventing address conflicts that may occur because of the sharing of contents referenced in a remote network with the entities of the local network.

According to another embodiment, the method also comprises a step of controlling a UPnP device of the local network through a UPnP control point of the local network. The local relay module is thereby also able to control UPnP entities of the local network. It becomes possible in a manner that is transparent for a user, to control through this local relay module both a UPnP entity of the local network and a UPnP entity of a remote network.

According to another embodiment, the method also comprises:
  a step of interrogating a UPnP control point of the local network in order to obtain at least one identification of a first UPnP device detected by this UPnP control point in the first network;
  a step of recording the received identification in association with identification data identifying the first relay module as an entity via which the first UPnP device may be controlled.

Thus, the local relay module has identifiers of the UPnP entities of the local network that it can use to identify the entities that it wishes to control through a UPnP control point.

According to another embodiment, the method also comprises a step of creating a list of at least one UPnP device that may be controlled from the first relay module, comprising the received identifier(s) of one said second relay module or of one UPnP control point of the local network. Since the local relay module is capable of knowing both the identifiers of UPnP devices of the local network and those of UPnP devices of a remote network, it becomes possible, in a manner transparent for a user, to control, through this local relay module, both a UPnP entity of the local network and a UPnP entity of a remote network.

According to another embodiment, the method also comprises a step of recording identification data of at least one said second relay module of a remote network in association with an identifier of a contact, which is a user of this remote network. Preferably, the management and identification for the remote relay modules with which the local relay module is able to communicate are carried out by association with contacts, users of a remote network and considered to be friends of at least one user of the local network. It is possible for access to the local network to be authorized only for known users of the latter user.

The various embodiments mentioned above can be combined together for the implementation of the invention.

According to an implementation, the various steps of the method are applied by computer software or program, this software comprising software instructions designed to be executed by a data processor of a relay module and being designed to command the execution of the various steps of this method.

Consequently, a further subject of the disclosure is a program suited for being executed by a computer or by a data processor, this program comprising instructions for commanding the execution of the steps of a method as mentioned above.

This program may use any programming language and be in the form of source code, object code or of a code intermediate between source code and object code, such as in a partially compiled form, or in any other desirable form.

A further subject of the disclosure is an information medium that can be read by a data processor and comprising instructions of a program as mentioned above.

The information medium may be any entity or device capable of storing the program. For example, the medium may comprise a storage means, such as an ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be routed via an electrical or optical cable, by radio or by other means. The program may in particular be downloaded from a network of the Internet type.

Alternatively, the information medium may be an integrated circuit in which the program is incorporated, the circuit being suitable for executing, or for being used in the execution of, the method in question.

According to one embodiment, an aspect of the invention is implemented by means of software and/or hardware components. For this purpose, the term "module" may correspond in this document both to a software component and to a hardware component or to a set of hardware and software components.

A software component corresponds to one or more computer programs, one or more subroutines of a program, or more generally to any element of a program or of a software capable of carrying out a function or a set of functions according to what is described below for the model concerned. Such a software component is executed by a data processor of a physical entity (terminal, server, gateway, set-top-box, router, etc.) and is capable of accessing the hardware resources of this physical entity (memories, recording media, communication bus, input/output electronic cards, user interfaces, etc.).

In the same way, a hardware component corresponds to any element of a hardware assembly capable of implementing a function or a set of functions according to what is described below for the module concerned. It may be a hardware component that can be programmed or with integrated processor for the execution of the software, for example an integrated circuit, a smartcard, a memory card, an electronic card for the execution of firmware, etc.

Correlatively, an embodiment of the invention relates, according to a second aspect, to a relay module of a local network, called a local relay module, configured to communicate with at least one second relay module of a remote network and comprising:

means for obtaining, via one said second relay module, at least one identifier of a UPnP device detected in one said remote network by a UPnP control point associated with said second relay module;

means for recording at least one received identifier in association with identification data of the second relay module that has supplied said at least one identifier;

means for controlling a UPnP device of said remote network through the control point associated with the second relay module, identified by the identification data recorded in association with an identifier of this UPnP device. The advantages set out for the method can be transposed directly to the relay module according to the invention.

More generally, the relay module comprises means for implementing the steps of the method according to an embodiment of the invention.

According to a third aspect, an embodiment of the invention relates to a relay module remote of a network configured to communicate with a first relay module according to the second aspect, this relay module comprising:

means for supplying to said first relay module at least one identifier of a UPnP device detected in the remote network by a UPnP control point associated with said relay module;

means for controlling a UPnP device of said remote network on request originating from the first relay module.

According to a fourth aspect, an embodiment of the invention relates to a UPnP control point of a first network associated with a first relay module according to the third aspect:

means for supplying to the first relay module at least one identifier of a UPnP device detected said UPnP control point;

means for controlling a UPnP device of the first network, said means being configured in order to, on request from the first relay module, transmit a UPnP request to one said UPnP device.

"Control point" means a UPnP entity designed to detect the presence in the network of UPnP devices and to control these devices by means of UPnP commands. Typically it involves entities in the UPnP/DLNA standard called "Control Point" (CP), "Digital Media Controller" (DMC) or else "Digital Media Player" (DMP), the latter entity incorporating the functions of a DMC.

BRIEF DESCRIPTION OF THE DRAWINGS

Other objects, features and advantages will appear through the following description given only as a nonlimiting example and made by reference to the appended drawings in which.

DETAILED DESCRIPTION OF ILLUSTRATIVE EMBODIMENTS

Figure 1:
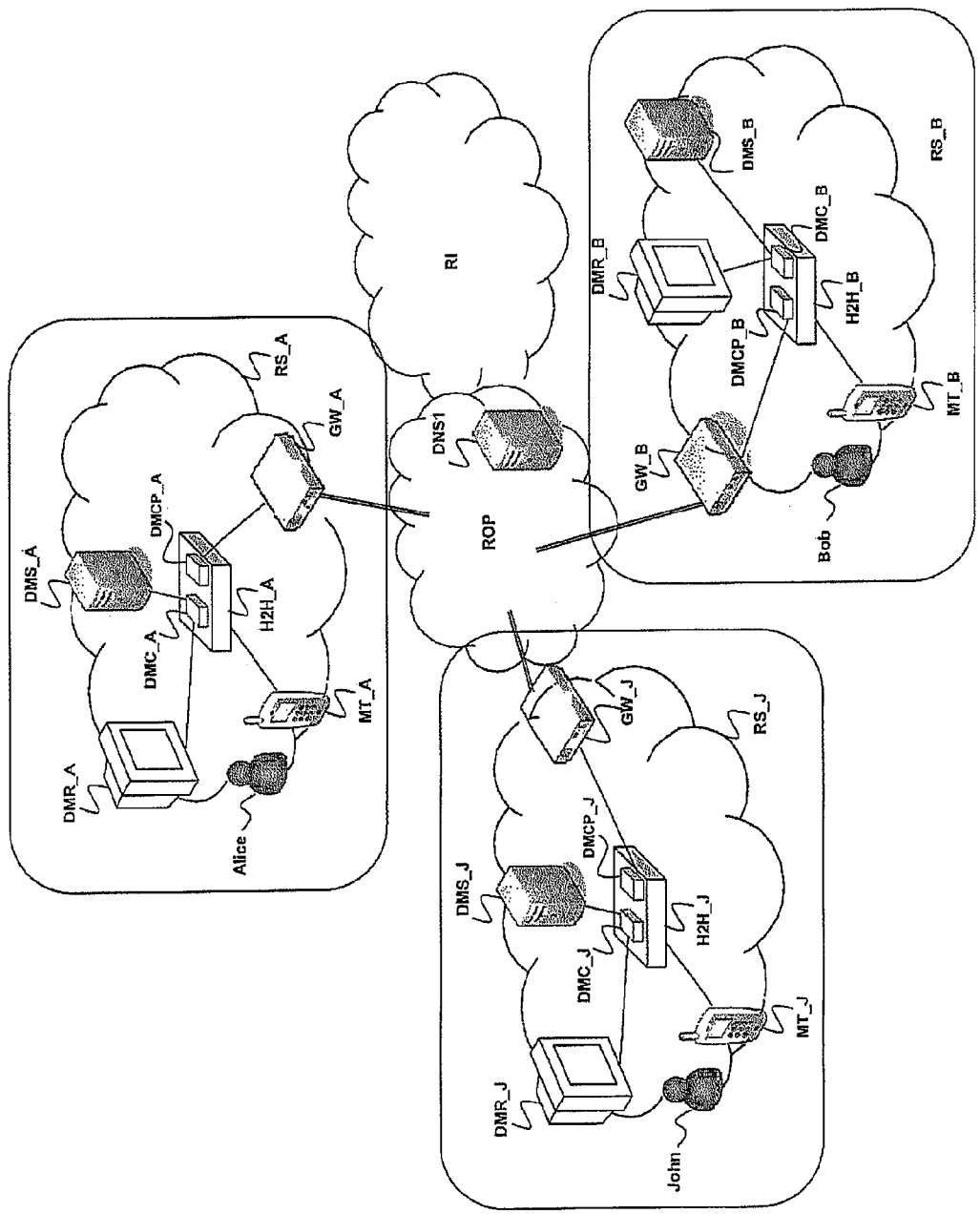
FIG. 1 represents schematically a communication system incorporating a relay module according to an embodiment of the invention.

An embodiment of the invention is described in greater detail in the case of its application to the controlling of remote entities located in a first network, called remote network, from an item of equipment of a network, called local network, distinct from this remote network. It solves a blocking problem of communication that appears when neither the item of equipment nor the local network is furnished with means for communicating with this remote network or these remote entities.

These remote entities are for example entities that can be controlled by means of the UPnP protocol. An embodiment of the invention notably makes it possible to control UPnP entities of a remote network from a local network and to do so as if this remote entity formed part of the local network and in a manner that is transparent for a user of the local network.

An embodiment of the invention specifically provides an extension of the UPnP command mechanism by providing the possibility of controlling UPnP entities of a remote network from a local network. Accordingly, an embodiment of the invention remedies a limitation that is inherent in the UPnP protocol as specified in the UPnP standard, which currently allows, from an item of equipment of a local network, only the command of UPnP entities of this same local network.

As an example, an embodiment of the invention can be applied to the rendering, by a rendering device of a local network, of contents referenced by a content server of a remote network and the rendering, by a rendering device of a remote network of contents referenced by a content server of a local network. These contents are for example multimedia contents (video and/or music clips).

The contents server is for example a contents server according to the UPnP (Universal Plug and Play) standard. Such a content server is called a "Digital Media Server" (DMS) in the context of the UPnP architecture. The rendering device is for example a rendering device according to the UPnP (Universal Plug and Play) standard. Such a content server is called a "Digital Media Renderer" (DMR) in the context of the UPnP architecture.

An embodiment of the invention is also applicable to the remote command of other types of entities according to the UPnP standard, notably the command of devices called "Digital Media Printer" devices.

The UPnP standard provides mechanisms and an architecture for interconnection of the peer network type between the UPnP entities. Each UPnP entity can be physically integrated into one of the terminals of the local network or else into an item of equipment of gateway type, set-top-box (STB), storage router or server of the NAS (Network Attached Storage) type, etc. The communication mechanisms provided in the UPnP standard are designed to allow interoperability between the UPnP entities. The UPnP protocol uses notably the TCP/UDP/IP (Transmission Control Protocol/User Datagram Protocol/Internet Protocol) protocols for the transport of UPnP requests.

In the context of this document, an entity is called a UPnP entity if it conforms to the UPnP standard or to another equivalent or derivative standard, notably if it uses a command protocol conforming to such a standard.

The mechanism proposed by an embodiment of the invention can also be transposed to other protocols used for the command of entities of a network, for example the "BONJOUR" protocol.

The system shown in FIG. 1 is organized around three local networks RS_A, RS_B and RS_A J, each in the form for example of a domestic network, and an extended network RI, for example the Internet network. The local network RS_A (respectively RS_B, respectively RS_J) is assumed to belong to a user named Alice (respectively Bob, respectively John).

This system also comprises the following entities:
- an item of equipment MT_A of the user Alice, in the form for example of a mobile terminal, in which a software application HUI_A is run;
- domestic gateways GW_A, GW_B, GW_J, serving as gateways for access to the networks RS_A, RS_B, RS_J respectively, these gateways interconnecting items of equipment connected to one of these networks with the extended network RI, via the network ROP of an operator, a provider of access to the extended network RI;
- contents servers DMS_A, DMS_B, DMS_J conforming to the UPnP standard connected respectively to the networks RS_A, RS_B, RS_J;
- contents-rendering devices DMR_A, DMR_B, DMR_J conforming to the UPnP standard connected respectively to the networks RS_A, RS_B, RS_J;
- control points DMC_A, DMC_B, DMC_J conforming to the UPnP standard connected to the networks RS_A, RS_B, RS_J respectively;
- relay modules DMCP_A, DMCP_B, DMCP_J associated respectively to the control points DMC_A, DMC_B, DMC_J connected respectively to the networks RS_A, RS_B, RS_J;
- a domain name server DNS1 (Domain Name Server, DynDNS) that is present in an operator network ROP of a network operator, the provider of the domestic gateway GW_A, this operator network ROP forming a network for access to the Internet network for the networks RS_A, RS_B, RS_J.

The suffix A, B or J added to a reference of a module or entity is therefore used to specify the location of each module: suffix A if the module belongs to the network of Alice, suffix B if it belongs to the network of Bob and suffix J if it belongs to the network of John. In the context of an embodiment of the invention, it is assumed, for the purpose of simplifying the explanation, that two modules with the same reference GW_, DMCP_, DMR_, DMS, etc.) but with different suffixes (A, B or J) are functionally identical in that they play the same role with respect to the entities of the network to which they respectively belong.

Contents Servers

Each of the contents servers DMS_A, DMS_B, DMS_J is a contents server conforming to the UPnP standard, or "Digital Media Server" (DMS). Consequently, it has a command interface conforming to the UPnP standard and can be controlled only by means of UPnP requests.

A UPnP request is usually sent by means of a function call via a programming software interface (API, Application Programming Interface) of the destination entity, representing a "UPnP service".

Rendering Devices

Each of the rendering devices DMR_A, DMR_B, DMR_J is a rendering device conforming to the UPnP standard, or "Digital Media Renderer" (DMR).

Consequently, it has a command interface conforming to the UPnP standard and can be controlled only by means of UPnP requests.

UPnP Control Points

Each of the UPnP control points DMC_A, DMC_B, DMC_J conforms to the UPnP standard, or DMC, "Digital Media Control" or CP, "Control Point".

According to the device-discovery mechanism provided in the UPnP/DLNA standard, each control point is responsible for the detection of connected UPnP devices in the network containing this control point. Therefore each control point keeps up to date a list of connected UPnP devices and detects both the appearances (new connected device) and disappearance (disconnection of a device).

Each control point is also designed to send UPnP requests to all the UPnP devices that are present in the network to which it belongs. These requests are notably the UPnP requests called "Browse" for browsing the directory of contents (CDS, Content Directory Service) of a UPnP content server or UPnP requests called "SetAVTransportURI" or "Play" for controlling the rendering of a content on a UPnP rendering device of the DMR (Digital Media Renderer) type.

In the context of an embodiment of the invention, the control point DMC_A, DMC_B, DMC_J is associated with a relay module DMCP_A, DMCP_B, DMCP_J and communicates to this relay module the information on the detected UPnP devices: identifier, description of services implemented by these devices.

In one embodiment, each control point notifies the relay module that is associated therewith in the event of connection/disconnection of a UPnP device. The relay module can therefore signal this connection/disconnection to any other remote relay module with which it has established a communication link. The remote relay module in question can then:
- either cease sending request to be translated to the control point that has detected a disconnection;
- or, on the contrary, begin sending requests to be translated to the control point that has detected a connection of a UPnP device, requests that will be translated into UPnP requests and then sent to this UPnP device.

Gateways

The domestic gateways GW_A, GW_B, GW_J are assumed to be functionally identical. The functions of the gateway GW_A, with respect to the entities of the network RS_A, which are described here in detail, can be transposed directly to the other gateways GW_B, GW_J.

The gateway GW_A is a gateway for the interconnection of the network RS_A with the Internet network RI via the network ROP of an access provider. It allows the terminals of the network RS_A to gain access to the Internet network RI. Conversely, the gateway allows—providing that the rights for such an access are granted—items of equipment of a network other than the network RS_A to communicate with an item of equipment of the local network RS_A.

The gateway GW_A comprises an interconnection module CG_A using the functions for interconnection between the network RS_A and the Internet network RI. For this purpose it comprises a first communication interface for communication with the entities of the network RS_A and a second communication interface for communication via the Internet network RI, notably with the entities that are external to the network RS_A. This second interface is used to communicate with an Internet Service Provider (ISP) of the operator of the network ROP, and with the domain name server DNS1.

The interconnection module CG_A comprises a first submodule, called an input interconnection module ICG_A, able to receive a data stream streamed into the network RS_A from a remote network and of transmitting it to an item of receiving equipment of this network RS_A. In this sense, the input interconnection module ICG_A acts as a reverse proxy.

The input interconnection module OCG_A is also able to decrypt an incoming data stream after receipt, which, when the data stream is transmitted according to the HTTPS protocol, amounts to converting the HTTPS protocol to HTTP.

The interconnection module CG_A also comprises another submodule, called an output interconnection module OCG_A, able to transmit an outgoing data stream leaving the network RS_A on its way to an item of equipment of a remote network. The output interconnection module OCG_A is also able to encrypt an outgoing data stream before transmission, which, when the data stream is transmitted according to the HTTP protocol amounts to converting the HTTP protocol to HTTPS.

The presence of the modules ICG_A and OCG_A carrying out conversions from HTTP to HTTPS and vice versa protects the data transmitted from one network to another, notably the contents transmitted to a rendering device, and fills a functional gap of the UPnP rendering devices, the latter not supporting the HTTPS protocol; they cannot communicate securely with an entity outside the network in which they are contained.

Like the gateway GW_A, the gateway GW_B (respectively GW_J) comprises an input interconnection module ICG_B (respectively ICG_J) and an output interconnection module OCG_B (respectively OCG_J) that are functionally identical to the input interconnection module ICG_A and output interconnection module OCG_A that have just been described.

Domain Name Server DNS1

The server DNS1 maintains a mapping table between public addresses and names assigned to the items of equipment that it manages. Specifically, the name assigned to the domestic gateway GW_A is static, that is to say does not change, but the public address of the domestic gateway GW_A changes periodically. It is therefore necessary, in order to communicate with this domestic gateway GW_A, to know its current public address and, for this, to interrogate the server DNS1 based on the name of the domestic gateway GW_A. This name corresponds to the network domain name managed by this gateway and is for example in the form:

myhome.homedns.org

This name may be assigned automatically by the network operator providing the domestic gateway GW_A or configured manually by a user of this gateway, the configuration of the domain name associated with the domestic gateway GW_A being in this second case carried out by means of the interconnection module CG_A which communicates for this purpose with the server DNS1.

The interconnection module CG_A also comprises an addressing module in the form of a UPnP device IGD (Internet Gateway Device) or of CGI (Common Gateway Interface), responsible for mapping the public ports and addresses with respect to the private ports and addresses of the items of equipment of the network RS_A in order to allow a device outside the network RS_A to communicate with such an item of equipment of this network RS_A by means of a public port number and address: on receipt of data sent to this public port and address, the interconnection module CG_A makes an address translation by determining the address and the port internal to the item of equipment of the network RS_A that is to receive these data.

This addressing module CG_A is also used notably to place a remote relay module DMCP_B or DMCP_J in communication with the relay module DMCP_A.

Relay Modules

The relay modules DMCP_A, DMCP_B, DMCP_J are functionally identical. The functions of the relay module DMCP_A, with respect to the entities of the network RS_A, which are described here in detail, can be transposed directly to the other relay modules DMCP_B, DMCP_J.

The relay module DMCP_A is a representative entity (proxy entity according to the Anglo-Saxon terminology): it serves as an intermediary for communication between the application HUI_A, run in the terminal MT_A, and the UPnP control point of the network RS_A of Alice. By virtue of the presence of the relay module DMCP_A, the UPnP control point of the network RS_A of Alice can be controlled remotely by an entity that does not conform to UPnP and/or that is not part of the network.

The relay module DMCP_A is able to communicate with the relay modules of the remote networks, in this instance with the relay module DMCP_B, respectively the relay module DMCP_C, running within an item of equipment of the network RS_B of Bob, respectively of the network RS_J of John. This dialogue is carried out according to an appropriate method, for example by means of remote procedure calls or of a request of the "web service" type conforming to a protocol chosen for example from XML_RPC, SOAP and REST. The requests interchanged between the relay module DMCP_A and the relay module DMCP_B or DMCP_J are in this case transported using the HTTP protocol.

In order to remedy the possible address conflicts that may appear because of the access to contents stored in one network from an entity of another network, the relay module DMCP_A uses two contents address translation functions.

In the UPnP standard, the address of a content is in the URI (Uniform Resource Identifier) form and stored in the metadata of this content by the UPnP contents server that references this content. An address ORIG_URI_C of a content C is in the form:

http://DMS_IP/objectID=1234 where:
"DMS_IP" is the IP address of the content server referencing this content;
"1234" is an identifier of the content C assigned by the content server referencing this content.

The first address translation function performed by the relay module DMCP_A is called the "source conversion" function. It consists in modifying an address ORIG_URI_C of a content so as to designate the input interconnection module ICG_A as the entity from which this content is available. This modification is made so as to preserve the original address ORIG_URI_C in the address SOURCE_URI_C obtained after conversion.

Such a "source conversion" address translation is necessary to prevent possible address conflicts with contents servers or contents originating from a network different from that in which the content C is stored. It is carried out by the relay module DMCP_A on all the URI addresses of contents referenced by a content server of the network RS_A, addresses that are contained in requests or responses to requests transmitted by the relay module DMCP_A to a remote network, RS_B or RS_J for example.

The "source conversion" function consists in using, in the URI address of a content, the IP address and the port number of the input interconnection module ICG_A as the identifier of the entity from which this content is available, so that the URI address after translation is suitable for an access to this content via the input interconnection module ICG_A of the domestic gateway GW_A, from an entity external to the network RS_A.

The address SOURCE_URI_C obtained after translation by application of the "source conversion" function is in the form:

http://ICG_A_IP:ICG_A_PORT/
    getContent?uri=ORIG_URI_CI where
"ICG_A_IP" is the IP address of the input interconnection module ICG_A, that is to say the public IP address of the domestic gateway GW_A;
"ICG_A_PORT" is the Internet port number of the input interconnection module ICG_A.

This address translation operation can be carried out by the relay module DMCP_A because the latter knows the parameters ICG_A_IP and ICG_A_PORT.

The reverse transformation, consisting in extracting the original URI address before transformation (ORIG_URI_C) is carried out by the input interconnection module ICG_A when an incoming request or response, comprising such an address SOURCE_URI_C, transmitted from a remote network RS_B or RS_J, and to an entity of the local network RS_A, reaches the input interconnection module ICG_A. The request containing the original address ORIG_URI_C is then transmitted by the input interconnection module ICG_A to an entity of the local network RS_A identified in the address ORIG_URI_C as an entity from which the contents can be obtained.

The second address translation function carried by the relay module DMCP_A is called the "destination conversion" function. It consists in modifying an address SOURCE_URI_C of a content, an address having already most frequently gone through the "source conversion" function carried out by a remote relay module DMCP_B or DMCP_J, so as to designate the output interconnection module OCG_A as the entity from which this content is available. This modification is carried out so as to preserve the address SOURCE_URI_C in the address DEST_URI_C obtained after conversion.

Such a "destination conversion" address translation is necessary in order to prevent possible address conflicts with contents servers or contents originating from a network other than that in which the content C is stored. It is carried out by the relay module DMCP_A on all the URI addresses of contents referenced by a content server of a remote network RS_B or RS_J, addresses that are contained in requests or request responses received by the relay module DMCP_A originating from a remote network, RS_B or RS_J for example.

The "destination conversion" function consists in using, in the URI address of a content, the IP address and the port number of the output interconnection module OCG_A as the identifier of the entity from which this content is available so that the URI address, after translation, is suitable for an access to this content via the output interconnection module OCG_A, from an entity inside the network RS_A.

The address DEST_URL_C obtained after translation by application of the "destination conversion" function is in the form:

http://OCG_A_IP:OCG_A_PORT/
    getContent?uri=SOURCE_URI_C where
"OCG_A_IP" is the IP address that is internal to the output interconnection module OCG_A, that is to say the private IP address (internal to the network RS_A) of the domestic gateway GW_A;
"OCG_A_PORT" is the internal Internet port number of the output interconnection module OCG_A.

This address translation operation can be carried out by the relay module DMCP_A because the latter knows the parameters OCG_A_IP and OCG_A_PORT.

The reverse transformation, consisting in extracting the original URI address before transformation (SOURCE_URI_C) is carried out by the output interconnection module OCG_A when an outgoing request or response, comprising such an address DEST_URI_C, transmitted from the local network RS_A and to a remote network RS_B or RS_J, reaches the output interconnection module OCG_A. The request comprising the address SOURCE_URI_C is then transmitted by the output interconnection module OCG_A to an input interconnection module of a remote network RS_B or RS_J identified in the address SOURCE_URI_C as the entity from which the content can be obtained.

The relay module DMCP_A is also designed to put together lists of UPnP devices obtained through a remote relay module (DMCP_B or DMCP_J) with a list of UPnP devices of the local network RS_A. These device lists are notably lists of contents servers or lists of rendering devices.

The relay module DMCP_A is also designed to receive a request, for example conforming to the HTTP protocol, from the application HUI_A, used in the terminal MT_A of Alice. Each HTTP request thus received is intended to be transmitted to a UPnP control point: either the UPnP control point (DMC_A) that is associated with the relay module DMCP_A, or a remote UPnP control point (DMC_B or DMC_J) associated with a remote relay module (DMCP_B or DMCP_J).

When the receiving UPnP control point is in the local network, the request is converted by the relay module DMCP_A in command, then sent to this local UPnP control point. The response to this command is transferred to the transmitting relay module DMCP_A through the local UPnP control point.

When the UPnP control point is in a remote network, the request is first transmitted, in the form of an HTTP request, by the relay module DMCP_A to the remote relay module (DMCP_B or DMCP_J) associated with this remote UPnP control point, before being translated by this remote relay module and then transferred in the form of a command to this remote UPnP control point. The response to this command is transferred to the transmitting relay module DMCP_A, successively by the remote UPnP control point then by the remote relay module (DMCP_B or DMCP_J), associated with this remote UPnP control point.

The relay module DMCP_A thus serves, on behalf of the application HUI_A, as a "representative" of the UPnP control point DMC_A.

Moreover, the relay module DMCP_A serves as a communication proxy for the remote relay module (DMCP_B or DMCP_J), itself a "representative" of a remote UPnP control point (DMC_B or DMC_J).

By virtue of the presence of the various relay modules DMCP_A, DMCP_B and DMCP_J, communicating with one another, and each serving as a representative of a UPnP control point, each of the UPnP entities of one of the networks furnished with these relay modules can be controlled remotely from an item of equipment that does not form part of the network to which such an entity belongs.

The command received by a (local or remote) UPnP control point is itself translated into a UPnP request, conforming with the UPnP standard, transmitted to a UPnP entity of the network in which the target control point is found, the (local or remote) UPnP control point receiving a response to the UPnP request, a response based on which this control point transmits, to the relay module that is associated therewith, a response to the command which it has itself received.

Application

The application HUI_A used in the terminal MT_A of Alice is used to send various requests to the relay module DMCP_A:

- request for identification of the UPnP contents servers that may be controlled from the relay module DMCP_A;
- request for identification of the UPnP rendering devices that may be controlled from the relay module DMCP_A;
- request to browse the contents referenced by a UPnP contents server that may be controlled from the relay module DMCP_A;
- request for rendering, by a UPnP rendering device that may be controlled from the relay module DMCP_A, of a content referenced by a UPnP contents server that may be controlled from the relay module DMCP_A.

The requests transmitted by the application HUI_A are transmitted for example in conformance with the HTTP protocol, then translated by the relay module DMCP_A into a command in order to be sent to the UPnP control point.

In practice, for any UPnP request that may be transmitted by a UPnP control point to a UPnP device, the application HUI_A able to transmit a request to the relay module DMCP_A, so that this relay module sends a command to the control point DMC_A that is associated therewith and so that this control point sends to this UPnP device the UPnP request in question.

A user interface is made available to a user of the terminal MT_A so that the user can control the application HUI_A, notably select a multimedia content to be rendered and initiate the rendering of this content.

This user interface consists for example of a web page, hosted by the relay module DMCP_A forming a web server, and transmitted to the terminal MT_A during a communication session set up through the Internet network RI with the relay module DMCP_A, the terminal MT_A and the relay module DMCP_A communicating for example by means of the HTTP protocol. This user interface may also be included in a software program embedded in the terminal MT_A and communicating with the relay module DMCP_A via the HTTP protocol.

Remote Network Management Module

The relay module DMCP_A is coupled to a remote network management module RNM_A (RNM standing for "Remote Network Management"). This module is used to store addressing data of entities of the remote networks. In the case of the network RS_A belonging to Alice, this module RNM_A is designed to record, in association with an identification of a contact of Alice (email address, forename or surname of the contact, telephone number or other information on the contact), addressing data of the gateway for access to the remote network belonging to this contact.

If, for example, Bob is included in the contacts of Alice, addressing data of the access gateway GW_B of the network of Bob are stored in the form of a network domain name or gateway public name, a name based on which the IP address currently assigned to the access gateway GW_B can be obtained by interrogating the server DNS1.

When the relay module DMCP_B or DMCP_J of a remote network is not incorporated into the access gateway GW_B or GW_J for access to a remote network, the module RNM_A is designed to record, in association with an identification of a contact of Alice, addressing data of at least one relay module DMCP_B or DMCP_J that is present in this remote network. These addressing data include for example an external port number of the access gateway GW_B or GW_J, mapped to an IP address that is internal to the remote network, assigned, in this remote network, to the relay module DMCP_B or DMCP_J. A communication with the relay module may be set up by an entity external to the remote network by means of this port number and of the network domain name associated with the access gateway GW_B or GW_J.

When the relay module DMCP_B or DMCP_J of a remote network is not incorporated into the access gateway GW_B or GW_J for access to a remote network, the network domain name associated with the access gateway GW_B or GW_J for access to the remote network is sufficient to communicate with this relay module DMCP_B or DMCP_J from an entity external to this remote network.

The addressing data of a relay module of a network of a contact of Alice can be recorded manually by Alice, through a user interface provided for this purpose, based on information supplied by Bob. When Bob authorizes Alice to access his network, a function may also be provided in the application HUI_B of Bob which initiates the transmittal, by the terminal MT_B, of a message comprising addressing data of the relay module DMCP_B, to Alice.

Each of the relay modules DMCP_A, DMCP_B, DMCP_J is designed to interrogate the remote network management module RNM_A, RNM_B or RNM_C that is respectively associated therewith, for the purpose of obtaining addressing data of a relay module that is present in a remote network.

Mapping Table

The relay module DMCP_A is coupled to a mapping table UMT_A (UMT standing for "UDN Mapping Table") which manages the associations between identifiers of UPnP devices and addressing data of the relay modules through which these modules can be controlled from another relay module. In the UPnP standard, the UPnP devices are identified by UDN (Unique Device Name) identifiers.

This mapping table UMT_A is designed so that, when the UPnP device is located in a given remote network, it can record, in association with a UDN identifier of this UPnP device, the addressing data of a remote relay module that is present in this remote network. This mapping table UMT_A is designed so that, when the UPnP device is located in the local network in which the associated relay module DMCP_A is contained, it can record, in association with a UDN identifier of this UPnP device, default addressing data (for example with a zero value) that are indicative of the fact that the relay module, through which this local UPnP device may be controlled, is located in the local network and corresponds to the relay module DMCP_A associated with this mapping table UMT_A.

The addressing data of a relay module of a network serve as identification data of this relay module and allow a device external to this network to communicate with this relay module. They comprise:

- an identification of this network, in the form of a network domain name, known to the server DNS1, based on which the IP address of the gateway for access to this network can be obtained,
- a public port number, assigned to this relay module by this access gateway, based on which the addressing module of the gateway determines an associated internal address and port number.

Each of the relay modules DMCP_A, DMCP_B, DMCP_J is designed to provide the mapping table UMT_A, UMT_B or UMT_J that is associated therewith with a UDN identifier of a UPnP device of a remote network and addressing data of a relay module (DMCP_B, DMCP_J in the case of the relay module DMCP_A) that has supplied this identifier and is located in the remote network in which this remote UPnP device is found. Each of the relay modules DMCP_A, DMCP_B, DMCP_J is also designed to provide the mapping table UMT_A, UMT_B or UMT_J that is associated therewith with a UDN identifier of a UPnP device of the local network RS_A and with addressing data indicating that the relay module DMCP_A through which this local UPnP device is present in the local network RS_A.

Conversely, each of the relay modules DMCP_A, DMCP_B, DMCP_J is designed to interrogate the mapping table UMT_A, UMT_B or UMT_J that is associated therewith for the purpose of ascertaining the addressing data of a remote relay module (DMCP_B, DMCP_J, in the case of the relay module DMCP_A) to which to transmit a request intended for a UPnP device identified by a given UDN identifier.

Access Control Module

The relay module DMCP_A is coupled to an access control module ACM_A (ACM standing for "Access Control Manager") which manages the access authorizations for the remote relay modules (DMCP_B, DMCP_J in the case of the relay module DMCP_A). This module is designed to record, in association with an identification of a remote relay module or of a remote network, an item of information representative of an authorization to respond, or a prohibition from responding, to a request from this remote relay module. These authorizations or prohibitions are for example entered manually by Alice via a user interface provided for this purpose. The identifications are recorded for example in the form of relay module addressing data, as recorded in the mapping table UMT_A and as configured by the module RNM_A.

According to one embodiment, these authorizations or prohibitions are detailed in order to define whether a remote relay module is or is not authorized to:
    access the contents of the local network and/or
    control the UPnP contents servers of the local network and/or
    control the UPnP rendering devices of the local network.

More precise rules for managing the authorizations or prohibitions can of course be envisaged: by content, by UPnP contents server, by UPnP rendering device, by requested operation, etc.

In order to verify the authorizations or prohibitions of a remote relay module, a request sent from one relay module to another comprises an identification of the remote relay module sending this request or of the network in which this remote relay module is found. This identification is inserted either as a parameter of the request, or in the header data of the request (in the identification fields of the transmitter of the request). Any other method of identifying the remote relay module can also be envisaged. An authentication of the remote relay module can also be envisaged.

Each of the relay modules DMCP_A, DMCP_B, DMCP_J is designed to interrogate the access control module ACM_A, ACM_B or ACM_J that is associated therewith for the purpose of determining whether it is authorized to respond to a request from a remote relay module (DMCP_B, DMCP_J in the case of the relay module DMCP_A) with which it is able to communicate.

Architecture

The modules that have just been described can be located in various items of equipment of the network RS_A, as soon as these modules are able to communicate with one another in the manner described.

The relay module DMCP_A is incorporated into the domestic gateway GW_A or into another item of equipment of the network RS_A. It is of course however possible to envisage that the various functions of this module are implemented in a distributed manner, that is to say in distinct physical items of equipment, provided that a communication link is provided between the entities implementing respectively each of these functions.

When the relay module DMCP_A is not incorporated into the domestic gateway GW_A, the relay module DMCP_A is designed to send addressing data to the addressing module of the interconnection module CG_A so that this addressing module can route to the relay module DMCP_A the requests that are sent to it. For this purpose, the relay module DMCP_A transmits to the addressing module of the interconnection module CG_A a port number and an IP address by means of which the relay module DMCP_A may be reached. This port number and IP address are stored in correspondence with the name of the public network associated with the domestic gateway GW_A and a public port number assigned to the relay module DMCP_A.

When the relay module DMCP_A is incorporated into the domestic gateway GW_A, no addressing device is necessary in the domestic gateway GW_A to reach the relay module DMCP_A from an item of equipment outside the network RS_A.

The remote network management module RNM_A, the access control module ACM_A and the mapping table UMT_A are incorporated into the gateway GW_A, into a set-top-box associated with this gateway, or into any other item of equipment of the network RS_A that has the resources (processor, memory, etc.) necessary for the operation of these entities.

Figure 2:
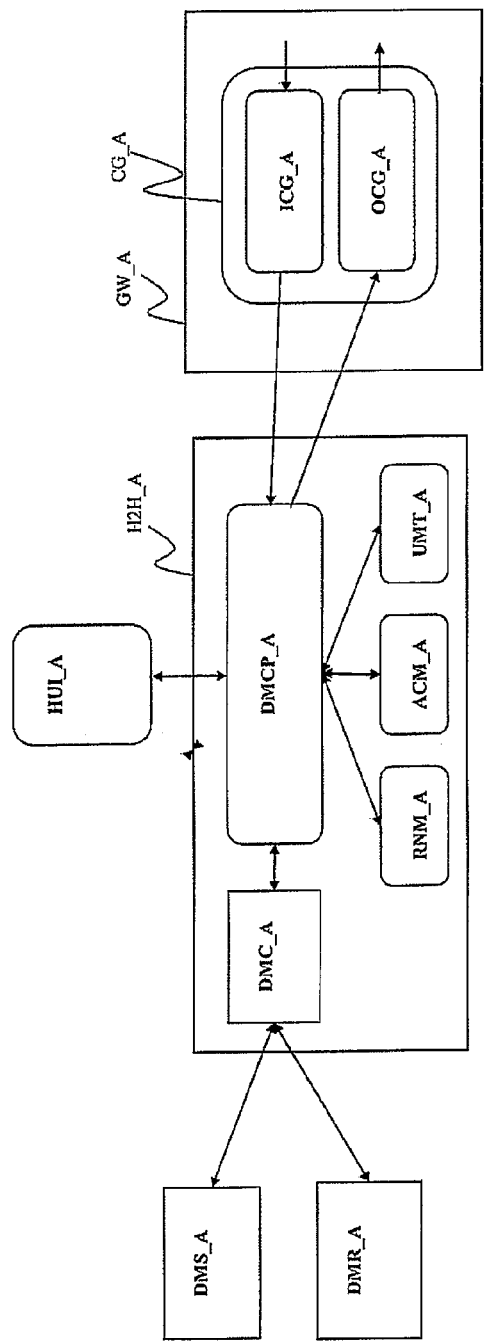
FIG. 2 represents schematically an architecture of a set-top-box used in one embodiment of the invention and incorporating a relay module according to an embodiment of the invention.

FIG. 2 illustrates one embodiment in which the relay module DMCP_A, the UPnP control point DMC_A, the remote network management module RNM_A, the access control module ACM_A and the mapping table UMT_A are incorporated into a set-top-box H2H_A communicating with the gateway GW_A. In this hypothesis, these various modules can correspond to functions or components of one and the same software program, communication between these modules then taking place simply by a function call.

The control method according to an embodiment of the invention is described in greater detail in the context of two use scenarios.

First Scenario

A first example of the control method according to an embodiment of the invention is described in greater detail with respect to FIGS. 3 to 6 through a scenario during which Alice selects, by means of her application HUI_A, a content C_B stored on a content server DMS_B located in the network RS_B of Bob and renders it on a UPnP rendering device DMR_A of the network RS_A.

In this context, the network RS_A of Alice is called the "local network" and the other networks RS_B and RS_J are called "remote networks". The same applies to the (local or remote) entities belonging to these networks.

This first scenario comprises four successive phases.

Figure 3:
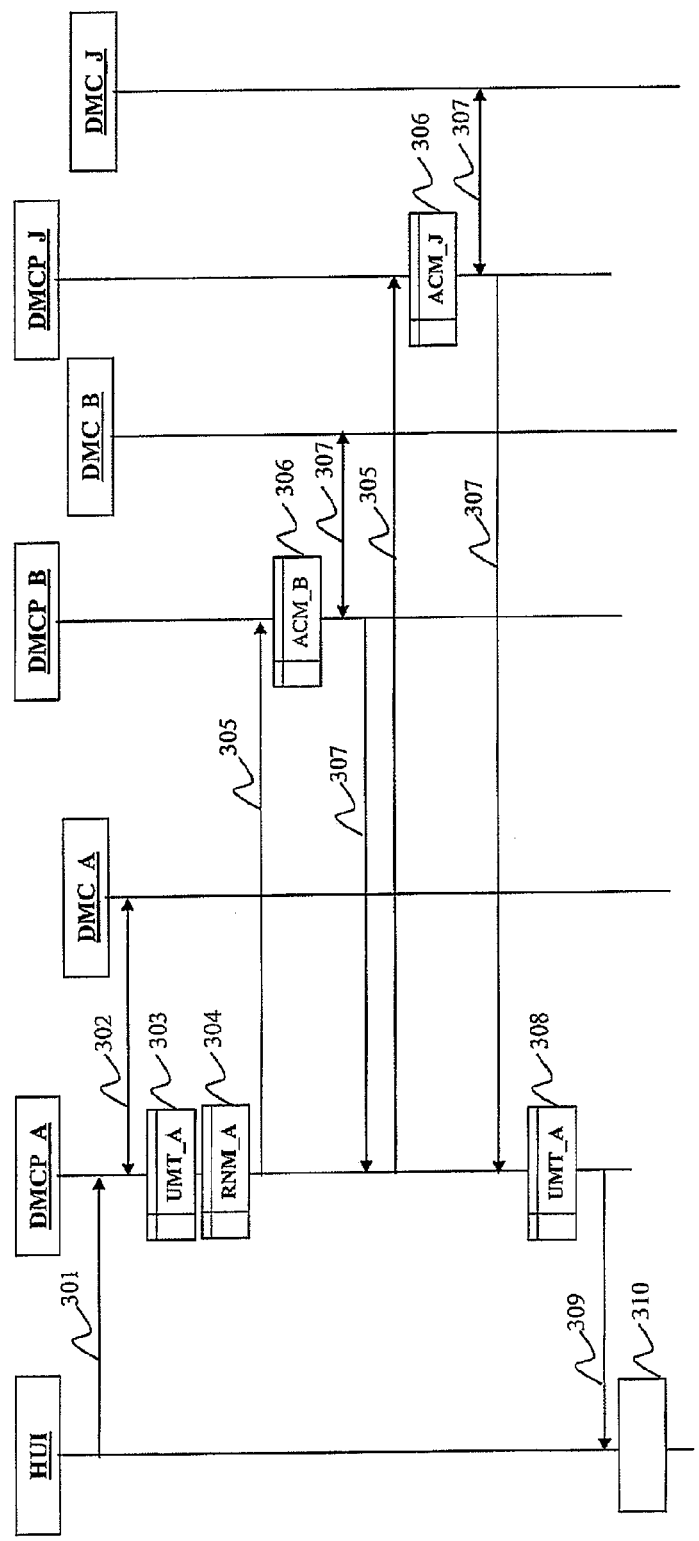
FIGS. 3 to 6 represent schematically the steps of a method according to the invention according to one embodiment, in the case of a first use scenario.

During the first phase, represented in FIG. 3, Alice uses her application HUI_A to display the list of UPnP rendering devices belonging to the network of Alice, Bob or John, and may be controlled from the network of Alice, and then, to choose from these devices, the UPnP rendering device on which she wants to render the content C_B.

During this phase, the relay module DMCP_A obtains the identifier(s) of the UPnP rendering device(s) of the remote networks RS_B and/or RS_J by means of the relay module DMCP_B and/or DMCP_J of this or these networks and of the control point that is associated therewith.

In step 301, the application HUI_A sends a request called "GetAllMediaRenderers" to the local relay module DMCP_A in order to obtain the list of UPnP rendering devices belonging to the network of Alice, of Bob or of John, and may be controlled from the network of Alice.

In step 302, on receipt of such a request, the local relay module DMCP_A interrogates the control point DMC_A that is associated therewith in the local network RS_A in order to obtain the list of UPnP rendering devices of the local network RS_A of Alice. As is known, these UPnP devices have been detected in this network by the control point DMC_A by applying the device discovery mechanism provided in the UPnP/DLNA standard. In the list obtained in return, each rendering device is identified by a unique UDN identifier.

In step 303, the local relay module DMCP_A updates the mapping table UMT_A by recording, in association with each UDN identifier received in step 302, addressing data identifying the relay module that has supplied this UDN identifier. In this instance, because the list has been obtained by the local relay module DMCP_A itself by interrogation of the control point that is associated therewith, an item of default addressing data (for example with a zero value) is recorded in association with each of the received UDN identifiers in order to signify that it is a UPnP rendering device of the local network.

In step 304, the local relay module DMCP_A interrogates the remote network management module RNM_A to obtain addressing data of the remote relay modules that are present in the remote networks of the contacts of Alice: in this instance, these remote relay modules are the relay modules DMCP_B and DMCP_J of the networks of Bob and John.

In step 305, the local relay module DMCP_A then interrogates each remote relay module by using the addressing data obtained for this module in order to obtain the list of UPnP rendering devices identified by this remote relay module, by sending a request called "GetLocalMediaRenderers".

In step 306, on receipt of the request "GetLocalMediaRenderers", the remote relay modules DMCP_B and DMCP_J of Bob and John interrogate their respective access control module ACM_B or ACM_J to determine whether they are authorized to respond to the requests from the local relay module DMCP_A of Alice.

In step 307, if one of these remote relay modules has the necessary authorizations, it interrogates its associated UPnP control point (DMC_B or DMC_J) in order to obtain the list of UPnP rendering devices of the local network in which this UPnP control point is found and sends to the local relay module DMCP_A the list thus obtained. In this list, each rendering device is identified by a unique UDN identifier. In step 307, if one of the remote relay modules DMCP_B or DMCP_J is not authorized to respond to the local relay module DMCP_A, it transmits no response, or else it transmits a response with an empty list, or else it transmits an error code that indicates that the requested operation is rejected.

In step 308, the local relay module DMCP_A receives the lists produced by the remote relay modules (DMCP_B and/or DMCP_J) and then updates the mapping table UMT_A by recording, in association with each received UDN identifier, the addressing data of the remote relay module DMCP_B or DMCP_J that has supplied this UDN identifier.

In step 309, the local relay module DMCP_A assembles in a single list the various lists of UPnP rendering devices received in steps 303 or 307 and then transmits this assembled list to the application HUI_A. This assembled list represents all of the rendering devices that may be controlled from the network of Alice.

In step 310, Alice chooses from the assembled list a rendering device on which she wants to render the content C_B: it is assumed in this instance that Alice chooses the rendering device DMR_A of the network of Alice.

Figure 4:
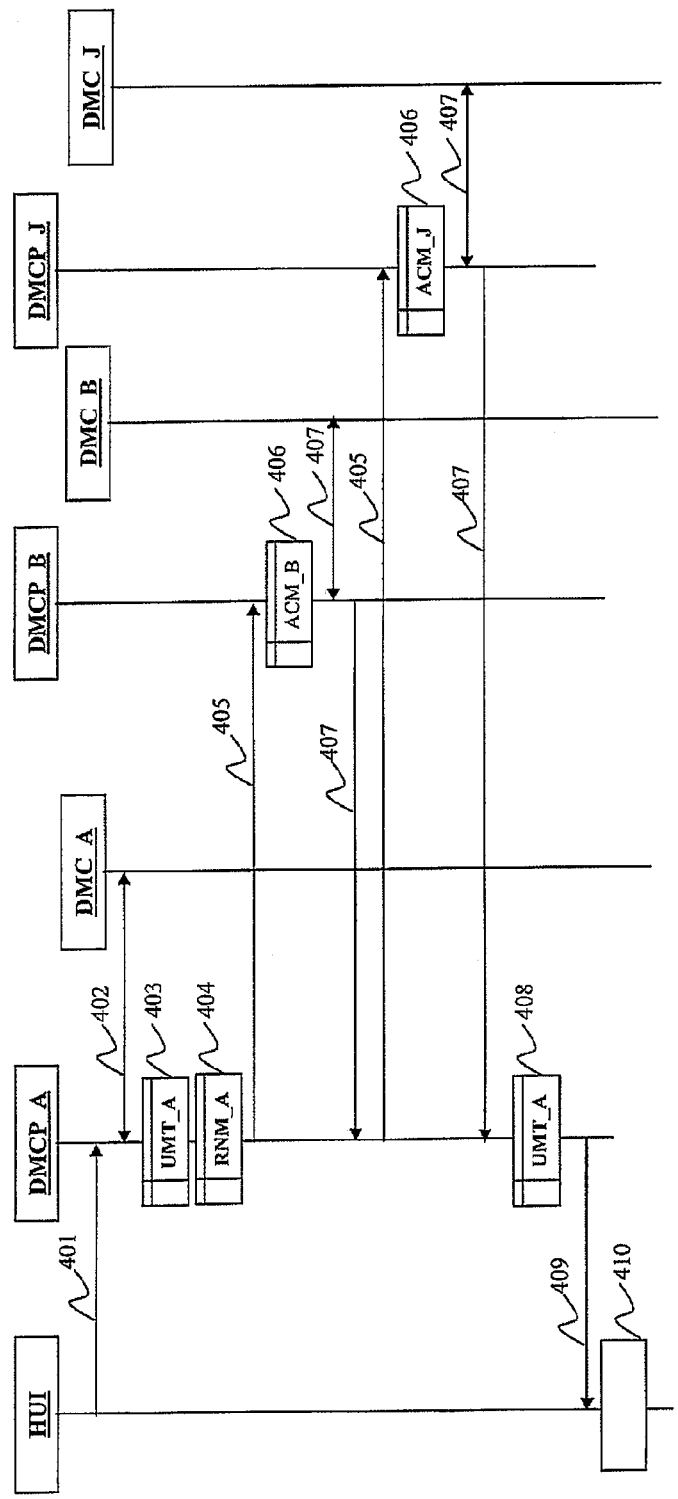

During the second phase, represented in FIG. 4, Alice uses her application HUI_A to display the list of UPnP contents servers belonging to the network of Alice, of Bob or of John, and that may be controlled from the network of Alice, and then, in order to choose from these servers a UPnP contents server storing the content C_B to be rendered. This second phase takes place in the same manner as the first phase, except that it relates to the identification of UPnP contents servers and not UPnP rendering devices.

During this phase, the relay module DMCP_A obtains the identifier(s) of the UPnP contents servers of the remote networks RS_B and/or RS_J by means of the relay module DMCP_B and/or DMCP_J of this or these networks and of the control point that is associated therewith.

In step 401, the application HUI_A sends a request called "GetAllMediaServers" to the local relay module DMCP_A in order to obtain the list of UPnP contents servers belonging to the network of Alice, of Bob or of John, and that may be controlled from the network of Alice.

In step 402, on receipt of such a request, the local relay module DMCP_A interrogates the control point DMC_A that is associated therewith in the local network RS_A in order to obtain the list of UPnP contents servers of the local network RS_A of Alice. As is known, these UPnP devices have been detected in this network by the control point DMC_A by using the device discovery mechanism provided in the UPnP/DNLA standard. In the list obtained in return, each contents server is identified by a unique UDN identifier.

In step 403, the local relay module DMCP_A updates the mapping table UMT_A by recording, in association with each UDN identifier received in step 402, addressing data identifying the relay module that has supplied this UDN identifier. In this instance, because the list has been obtained by the local relay module DMCP_A itself by interrogation of the UPnP control point DMC_A that is associated therewith, a default item of addressing data (for example the value zero) is recorded in association with each of the received UDN identifiers in order to signify that it is a UPnP content server of the local network that can be controlled through the local network by means of the UPnP control point DMC_A associated with the relay module DMCP_A of this network.

In step 404, the local relay module DMCP_A interrogates the remote network management module RNM_A to obtain addressing data of the remote relay modules that are present in the remote networks of the contacts of Alice: in this instance, these remote relay modules are the relay modules DMCP_B and DMCP_J of the networks of Bob and John.

In step 405, the local relay module DMCP_A then interrogates each remote relay module by using the addressing data obtained for this module in order to obtain the list of UPnP contents servers identified by this remote relay module, by sending a request called "GetLocalMediaServers".

In step 406, on receipt of the request "GetLocalMediaServers", the remote relay modules DMCP_B and DMCP_J of Bob and of John interrogate their respective access control module ACM_B or ACM_J to determine whether they are authorized to respond to the requests from the local relay module DMCP_A of Alice.

In step 407, if one of these remote relay modules has the authorizations necessary, it interrogates its associated UPnP control point (DMC_B or DMC_J) to obtain the list of UPnP contents servers of the local network in which this UPnP control point is found and sends to the local relay module DMCP_A the list thus obtained. In this list, each contents server is identified by a unique UDN identifier. In step 407, if one of the remote relay modules DMCP_B or DMCP_J is not authorized to respond to the local relay module DMCP_A, it transmits no response or transmits a response with an empty list, or else it transmits an error code that indicates that the requested operation is rejected.

In step 408, the local relay module DCMP_A receives the lists produced by the remote relay modules (DMCP_B and/or DMCP_J) and then updates the mapping table UMT_A by recording, in association with each received UDN identifier, the addressing data of the remote relay module DMCP_B or DMCP_J that has supplied this UDN identifier.

In step 409, the local relay module DMCP_A assembles in a single list the various UPnP contents-server lists received in steps 403 and 407, and then transmits this assembled list to the application HUI_A. This assembled list represents all the contents servers that Alice may control by means of her application HUI_A.

In step 410, Alice chooses from the assembled list a contents server storing the content C_B to be rendered: it is assumed here that Alice chooses the contents server DMS_B of the network of Bob.

Figure 5:
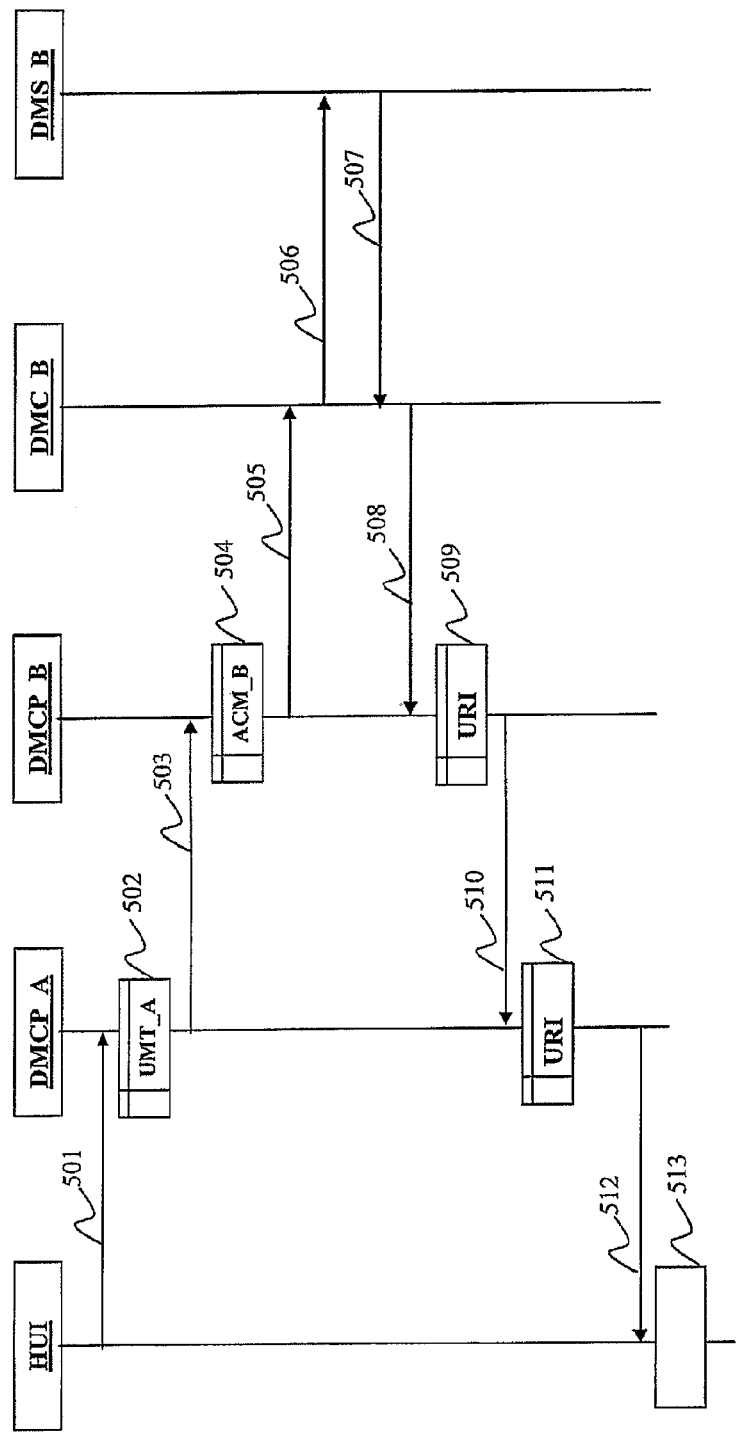

During the third phase, represented in FIG. 5, Alice consults a list of contents of the contents server DMS_B in order to select therefrom the content C_B to be rendered.

During this phase, the relay module DMCP_A controls the contents server DMS_B of the remote network RS_B through the relay module DMCP_B that has supplied the identifier of this UPnP contents server and of the control point associated with this relay module.

In step 501, the application HUI_A sends to the local relay module DMCP_A a request to interrogate the content server DMS_B in order to obtain the list of contents stored on this contents server. This request contains the UDN identifier specific to the contents server DMS_B concerned, an identifier that is marked UDN_DMS_B.

In step 502, the local relay module DMCP_A obtains, by reading in the mapping table UMT_A the addressing data stored in step 408 in association with the identifier UDN_DMS_B: these addressing data are in this instance addressing data of the remote relay module DMCP_B of the network of Bob. This means that the contents server DMS_B concerned forms part of the remote network RS_B in which this remote relay module DMCP_B is found. The local relay module DMCP_A then converts the request of the application HUI_A into a request suitable for being sent to the remote relay module DMCP_B, this request comprising the identifier UDN_DMS_B and being designed to cause the transmittal by the remote relay module DMCP_B of an interrogation request to interrogate the contents server DMS_B, via the DMC associated with the relay module.

In step 503, the local relay module DMCP_A transmits the request thus formed to the remote relay module DMCP_B.

In step 504, on receipt of this request, the remote relay module DMCP_B interrogates its access control module ACM_B to determine whether it is authorized to respond to this request from the local relay module DMCP_A of Alice.

In step 505, if the remote relay module DMCP_B has the necessary authorizations, it sends a command to the control point DMC_B that is associated therewith, comprising the identifier UDN_DMS_B, so that the control point DMC_B interrogates the contents server DMS_B in order to obtain the list of contents stored by this server. If it does not, no command is sent.

In step 506, the control point DMC_B transmits a UPnP request called "Browse" to the contents server DMS_B.

In step 507, the control point DMC_B receives the response to the "Browse" request from the contents server DMS_B. This response includes a list of contents, their metadata and respective URI addresses.

In step 508, the remote relay module DMCP_B receives from the control point DMC_B the information contained in the response to the "Browse" request from the contents server DMS_B, notably the list of contents, the metadata and URI addresses.

In step 509, the remote relay module DMCP_B modifies the URI addresses of all the contents of this list, by applying the conversion function called "source conversion". The original URI address of the content C_B, as supplied by the contents server DMS_B is marked ORIG_URI_C_B and the URI address generated by the remote relay module DMCP_B is marked SOURCE_URI_C_B by application of the "source conversion" function to the original URI address ORIG_URI_C_B. The address SOURCE_URI_C_B designates the input interconnection module ICG_B as the entity from which the content C_B is available.

In step 510, the remote relay module DMCP_B transmits to the local relay module DMCP_A the list of contents, comprising, as URI address, the addresses obtained after application of the "source conversion" function.

In step 511, the local relay module DMCP_A receives the response from the remote relay module DMCP_B and changes the URI addresses of all the contents of this list, by applying the conversion function called "destination conversion". The URI address generated by the local relay module DMCP_A is marked DEST_URI_C_B by application of the "destination conversion" function to the URI address SOURCE_URI_C_B. The address DEST_URI_C_B designates the output interconnection module OCG_A as the entity from which the content C_B is available.

In step 512, the local relay module DMCP_A transmits to the application HUI_A the list of contents comprising, as URI address, the addresses obtained after application of the "destination conversion" function.

In step 513, the application HUI_A presents to Alice the list of received contents and Alice chooses therefrom the content C_B to be rendered on the rendering device DMR_A.

Figure 6:
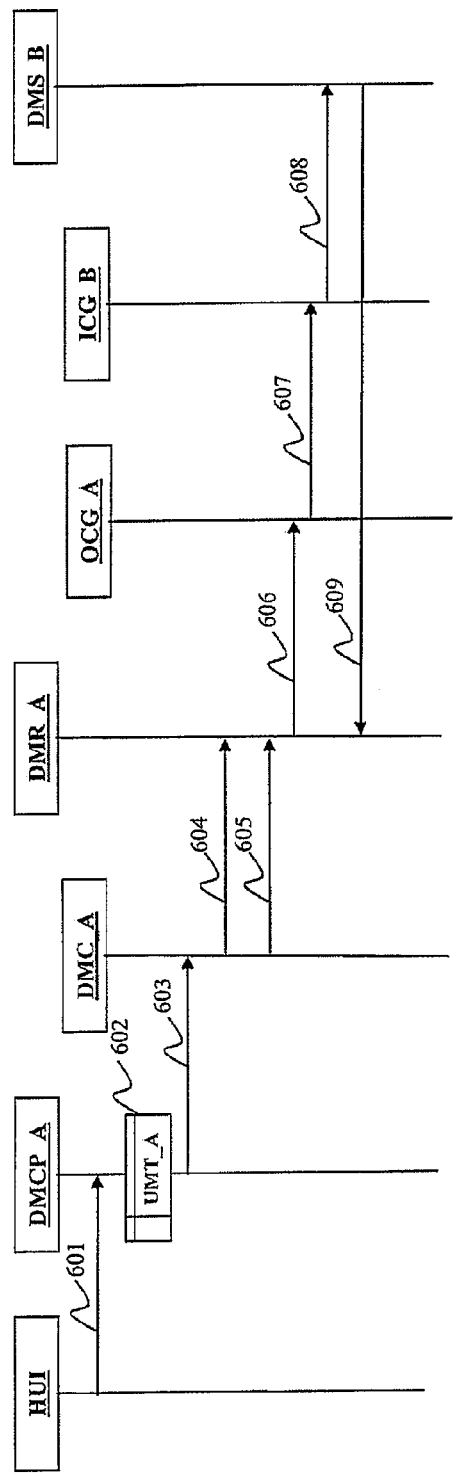

During the fourth phase, represented in FIG. 6, Alice proceeds with the rendering of the content C_B on her rendering device DMR_A.

In step 601, the application HUI_A sends to the local relay module DMCP_A a rendering request in order to initiate the rendering of the content C_B on the rendering device DMR_A, this request including the URI address DEST_URI_C_B of the content C_B and the UDN identifier specific to the rendering device DMR_A concerned, the identifier that is marked UDN_DMR_A.

In step 602, the local relay module DMCP_A obtains, by reading, in the mapping table UMT_A, the addressing data stored in association with the identifier UDN_DMR_A: these addressing data are in this instance addressing data (for example with a zero value) identifying a local module, that is to say the local relay module DMCP_A of the network of Alice. This means that the rendering device DMR_A concerned forms part of the local network RS_A in which this local relay module DMCP_A is located. The local relay module DMCP_A therefore converts the request from the application HUI_A into a command of the control point DMC_A that is associated therewith. This command comprises the URI address DEST_URI_C_B of the content C_B and the identifier UDN_DMR_A and its object is to initiate the transmittal to the rendering device identified by this identifier— that is to say to the rendering device DMR_A—a request to initiate the rendering of the content C_B.

In step 603, the local relay module DMCP_A transmits the command thus formed to the control point DMC_A.

In step 604, the control point DMC_A sends to the rendering device DMR_A a UPnP request called "SetAVTransportURI", comprising the URI address DEST_URI_C_B, this request being used to identify the content to be rendered.

In step 605, the control point DMC_A then sends a UPnP request called "Play" to the rendering device DMR_A, this request being used to initiate the rendering of the content previously identified by the request "SetAVTransport URI".

In step 606, the rendering device DMR_A transmits an HTTP request of a "GET" type to obtain the data of the content C_B identified by the request "SetAVTransportURI", this request including the URI address DEST_URI_C_B. Because of its composition, this URI address identifying the output interconnection module OCG_A as the entity from which the content is available, this request is routed to this output interconnection module OCG_A.

In step 607, on receipt of this request, the interconnection module CG_A extracts the address SOURCE_URI_C_B from the address DSET_URI_C_B then substitutes in the HTTP request received the address DEST_URI_C_B with the address SOURCE_URI_C_B before forwarding this request. Because of its composition, this URI address SOURCE_URI_C_B identifying the input interconnection module ICG_B as the entity from which the content is available, this request is redirected to this input interconnection module ICG_B.

In step 608, on receipt of this request, the input interconnection module ICG_B extracts the address ORIG_URI_C_B from the address SOURCE_URI_C_B, and then substitutes in the HTTP request received the address SOURCE_URI_C_B with the address ORIG_URI_C_B before forwarding this request. Because of its composition, this URI address ORIG_URI_C_B identifying the content server DMS_B as the entity from which the content is available, this request is redirected to this content server DMS_B.

In step 609, on receipt of this request, the content server DMS_B responds to the HTTP request "GET" by transmitting the content data, this response being transmitted to the sender of the HTTP request, that is to say to the rendering device DMR_A. The latter is then able to render the content C_B.

Second Scenario

A second example of application of an embodiment of the invention is described in greater detail with respect to FIGS. 7 to 10 through a scenario during which Alice requests, by means of her application HUI_A, for a content C_A stored on a contents server located in the network of Alice to be rendered on a UPnP rendering device DMR_B of the network of Bob.

In this context, the network RS_A of Alice is called the local network and the other networks RS_B and RS_J are called remote networks. The same applies to the (local or remote) entities belonging to these networks.

This second scenario comprises four successive phases.

Figure 7:
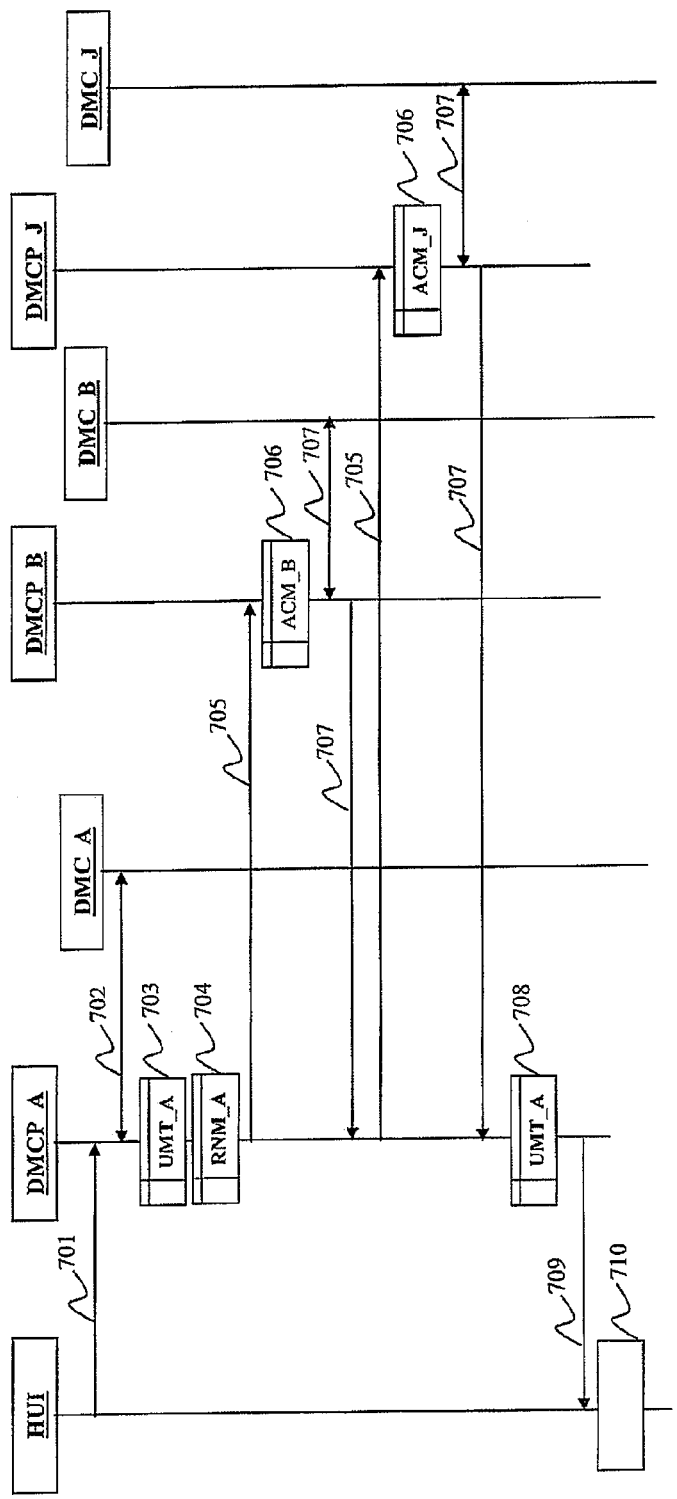
FIGS. 7 to 10 represent schematically the steps of a method according to the invention according to one embodiment, in the case of a second use scenario.

During the first phase, represented in FIG. 7, Alice uses her application HUI_A to display the list of UPnP rendering devices belonging to the network of Alice, of Bob or of John and that may be controlled from the network of Alice, and then, to choose from these devices the UPnP rendering device on which she wishes to render the content C_A.

During this phase, the relay module DMCP_A obtains the identifier(s) of the UPnP rendering devices of the remote networks RS_B and/or RS_J by means of the relay module DMCP_B and/or DMCP_J of this or these networks and of the control point that is associated therewith.

Steps 701 to 709 of this first phase are identical to steps 301 to 309 respectively. They culminate in the supply, by the local relay module DMCP_A, to the application HUI_A, of an assembled list representing all of the rendering devices that may be controlled from the network of Alice, by means notably of the application HUI_A.

In step 710, Alice chooses from the assembled list a rendering device on which she desires to render the content C_A: it is assumed here that Alice chooses the rendering device DMR_B of the network of Bob.

Figure 8:
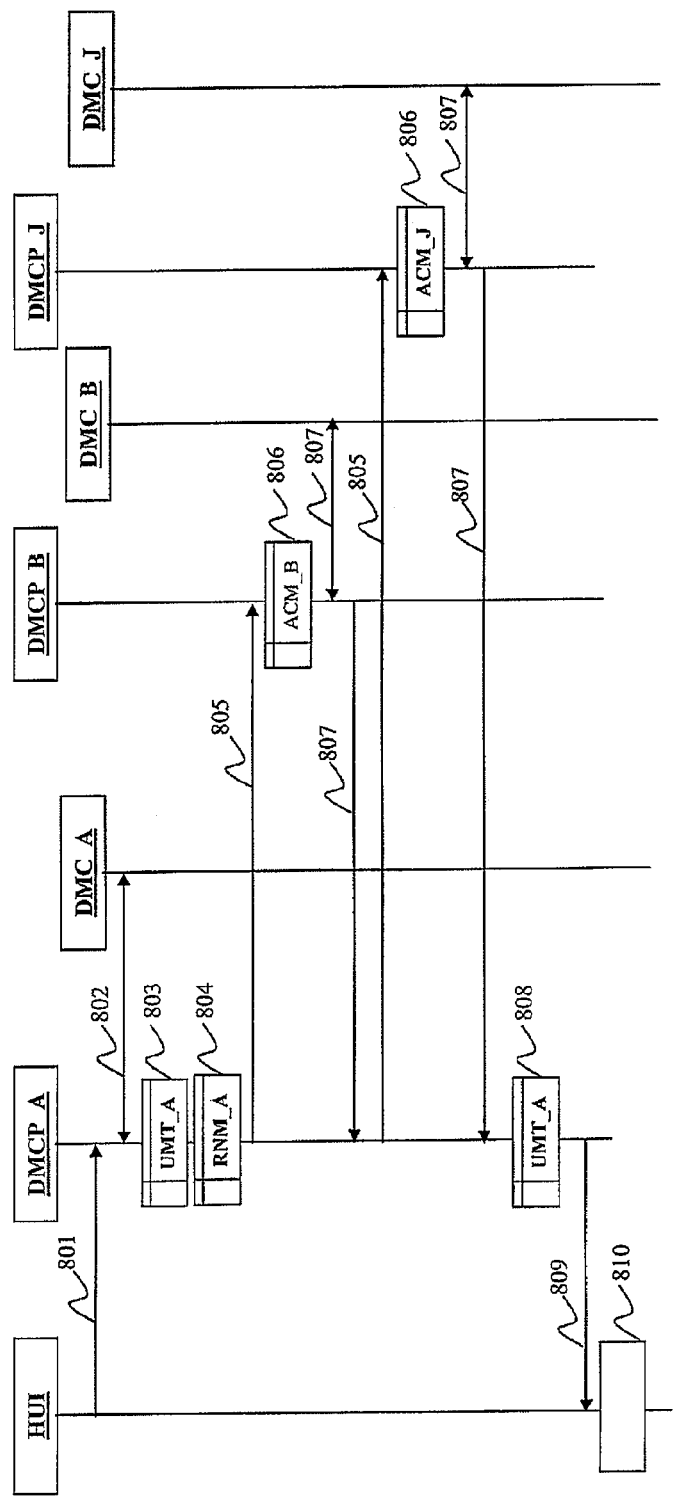

During the second phase, represented in FIG. 8, Alice uses her application HUI_A to display the list of UPnP contents servers belonging to the network of Alice, of Bob or of John and that may be controlled from the network of Alice, and then to choose from these servers a UPnP contents server storing the content C_A to be rendered.

During this phase, the relay module DMCP_A obtains the identifier(s) of the UPnP contents servers of the remote networks RS_B and/or RS_J by means of the relay module DMCP_B and/or DMCP_J of this or these networks and of the control point that is associated therewith.

Steps 801 to 809 of this second phase are identical to steps 401 to 409 respectively. They culminate in the supply, by the local relay module DMCP_A, to the application HUI_A, of an assembled list representing all of the contents servers that may be controlled from the network of Alice, by means notably of the application HUI_A.

In step 810, Alice chooses from the assembled list a contents server storing the content C_A to be rendered; it is assumed here that Alice chooses the contents server DMS_A of the network of Alice.

Figure 9:
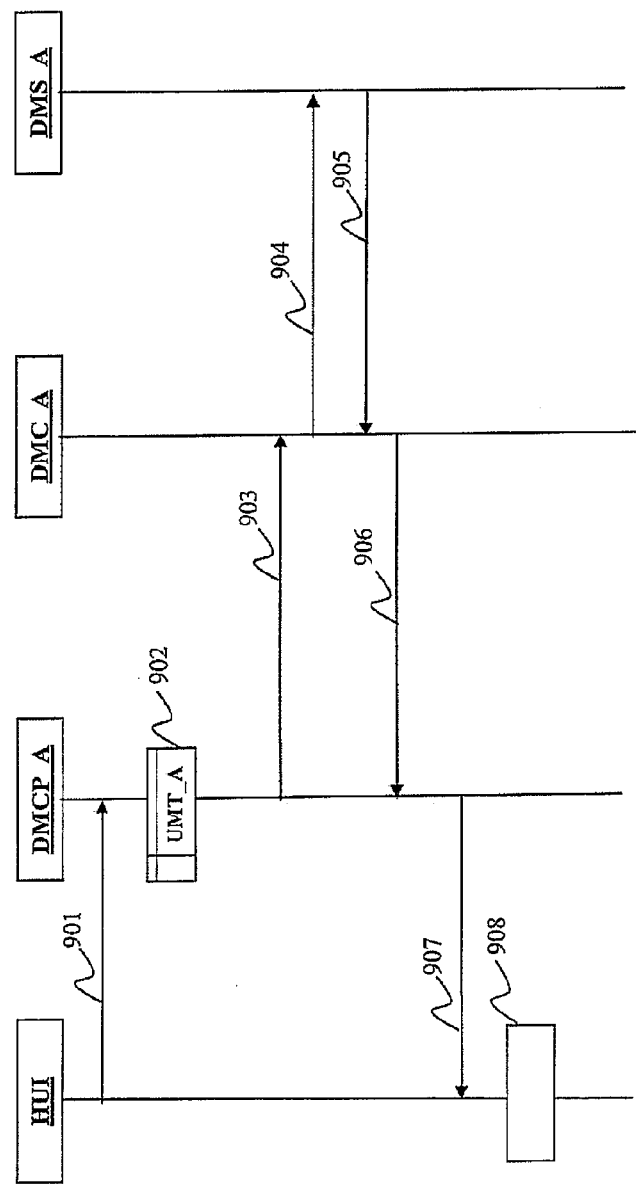

During the third phase, represented in FIG. 9, Alice consults the list of contents of the contents server DMS_A in order to select therefrom the content C_A to be rendered.

In step 901, the application HUI_A sends to the local relay module DMCP_A a request to interrogate the content server DMS_A in order to obtain the list of contents stored on this contents server. This request contains the UDN identifier specific to the contents server DMS_A concerned, an identifier that is marked UDN_DMS_A.

In step 902, the local relay module DMCP_A obtains, by reading, in the mapping table UMT_A, the addressing data stored in association with the identifier UDN_DMS_A: these addressing data are in this instance addressing data (for example with a zero value) identifying a local module, that is to say the local relay module DMCP_A of the network of Alice. This means that the contents server DMS_A concerned forms part of the local network RS_A in which this local relay module DMCP_A is found. The local relay module DMCP_A therefore converts the request of the application HUI_A into a command of the control point DMC_A that is associated therewith, this command comprising the identifier UDN_DMS_A and designed to initiate the transmittal to the contents server identified by this identifier—that is to say to the contents server DMS_A—a request to interrogate this server.

In step 903, the local relay module DMCP_A transmits the command thus formed to the control point DMC_A.

In step 904, the control point DMC_A sends to the contents server DMS_A a UPnP request called "Browse", in order to obtain the list of contents stored in this server.

In step 905, the control point DMC_A receives the response to the UPnP request "Browse". This response includes a list of contents, their metadata and respective URI addresses.

In step 906, the local relay module DMCP_A receives from the control point DMC_A the information contained in the response to the "Browse" request from the contents server DMS_A: list of contents, metadata and URI addresses.

In step 907, the local relay module DMCP_A transmits the list of contents received to the application HUI_A. No conversion of the URI addresses of the contents is carried out in this case by the local relay module DMCP_A because the contents are stored in the local network.

In step 908, the application HUI_A presents to Alice the received contents list and Alice chooses therefrom the content C_A to be rendered on the rendering device DMR_B.

Figure 10:
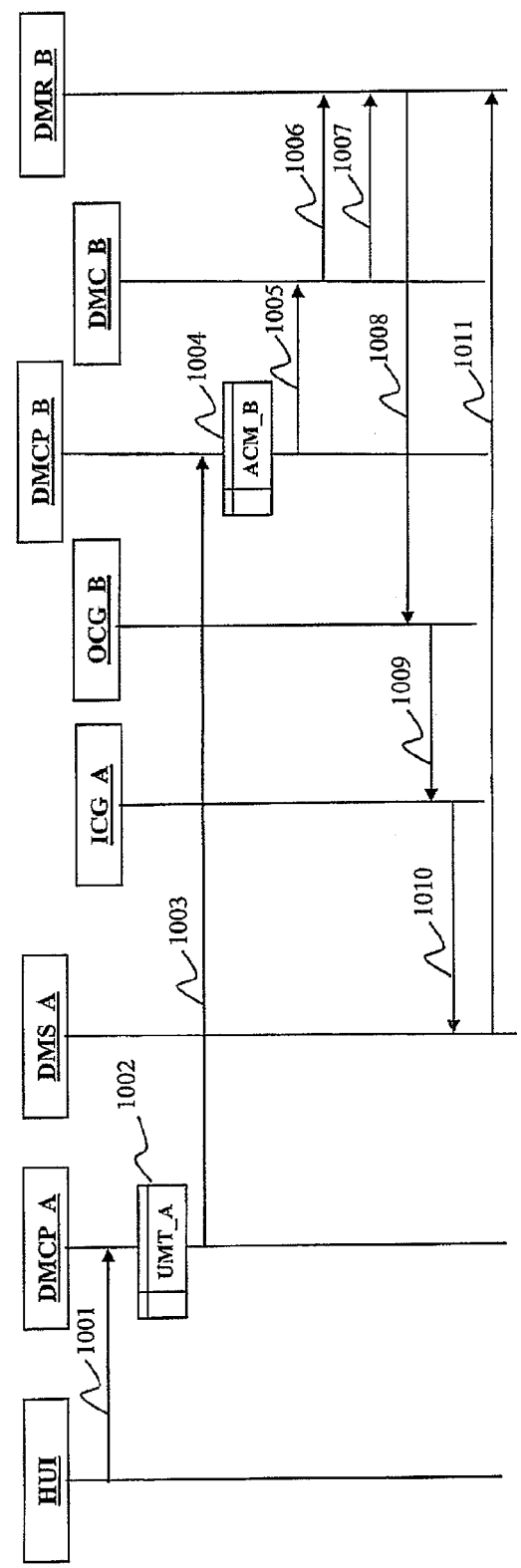

During the fourth phase, represented in FIG. 10, Alice decides to initiate the reading of the content C_A on the rendering device DMR_B of Bob.

During this phase, the relay module DMCP_A controls the rendering device DMR_B of the remote network RS_B through the relay module DMCP_B that has supplied the identifier of this UPnP rendering device and of the control point that is associated therewith.

In step 1001, the application HUI_A sends to the local relay module DMCP_A a rendering request to initiate the rendering of the content C_A on the rendering device DMR_B, this request including the URI address ORIG_URI_C_A of the content C_A and the UDN identifier specific to the rendering device DMR_B concerned, an identifier that is marked UDN_DMR_B.

In step 1002, the local relay module DMCP_A obtains, by reading in the mapping table UMT_A, the addressing data stored in association with the identifier UDN_DMR_B: these addressing data are in this instance addressing data of the remote relay module DMCP_B of the network of Bob. This means that the rendering device DMR_B concerned forms part of the remote network RS_B in which this remote relay module DMCP_B is found. The local relay module DMCP_A therefore converts the request of the application HUI_A into a request suitable for being sent to the remote relay module DMCP_B. This request includes the identifier UDN_DMR_B and the URI address SOURCE_URI_C_A of the content C_A, obtained from the URI address ORIG_URI_C_A by application of the conversion function called "source conversion". This request is designed to cause the transmittal by the remote relay module DMCP_B of a rendering request to the rendering device DMR_B. The address SOURCE_URI_C_A designates the input interconnection module ICG_A as the entity from which the content C_A is available.

In step 1003, the local relay module DMCP_A transmits the request thus formed to the remote relay module DMCP_B.

In step 1004, on receipt of this request, the remote relay module DMCP_B interrogates its access control module ACM_B to determine whether it is authorized to respond to this request from the local relay module DMCP_A of Alice.

In step 1005, if the remote relay module DMCP_B has the authorizations necessary, it generates a command comprising the identifier UDN_DMR_B of the rendering device DMR_B and the URI address DEST_URI_C_A of the content C_A obtained from the URI address SOURCE_URI_C_A by application of the conversion function called "destination conversion". The address DEST_URI_C_A designates the output interconnection module OCG_B as the entity from which the content C_A is available. The remote relay module DMCP_B sends this command to the control point DMC_B that is associated therewith in order to initiate the rendering of this content on this rendering device. If the remote relay module DMCP_B does not have the necessary authorizations, no command is sent.

In step 1006, the control point DMC_B sends to the rendering device DMR_B a UPnP request called "SetAVTransportURI" comprising the URI address DEST_URI_C_A, this request being used to identify the content to be rendered.

In step 1007, the control point DMC_B then sends to the rendering device DMR_B a UPnP request called "Play", this request being used to initiate the rendering of the content previously identified by the request "SetAVTransportURI".

In step 1008, the rendering device DMR_B transmits an HTTP request of the "GET" type to obtain the data of the content C_A identified by the request "SetAVTransportURI", this request comprising the URI address DEST_URI_C_A. Because of its composition, this URI address identifying the output interconnection module OCG_B as the entity from which the content is available, this request is routed to the output interconnection module OCG_B.

In step 1009, on receipt of this request, the output interconnection module OCG_B extracts the address SOURCE_URI_C_A from the address DEST_URI_C_A, then substitutes in the HTTP request received the address DEST_URI_C_A with the address SOURCE_URI_C_A before forwarding this request. Because of its composition, this URI address SOURCE_URI_C_A identifying the input interconnection module ICG_A as the entity from which the content is available, this request is redirected to the input interconnection module ICG_A.

In step 1010, on receipt of this request, the input interconnection module ICG_A extracts the address ORIG_URI_C_A from the address SOURCE_URI_C_A, then substitutes in the HTTP request received the address SOURCE_URI_C_A with the address ORIG_URI_C_A before forwarding this request. Because of its composition, this URI address ORIG_URI_C_A identifying the content server DMS_A as the entity from which the content is available, this request is redirected to this content server DMS_A.

In step 1011, on receipt of this request, the content server DMS_A responds to the HTTP request GET by transmitting the data of the content, this response being transmitted to the sender of the HTTP request, that is to say to the rendering device DMR_B. The latter is then able to render the content C_A.

Other Scenarios

An embodiment of the invention is applicable to any other scenario requiring the control of a UPnP entity of a remote network from a local network; rendering of a content of a remote residue on a rendering device of another remote network or of the same remote network, browsing of the contents of servers located in various remote networks, etc.

Although the present disclosure has been described with reference to one or more examples, workers skilled in the art will recognize that changes may be made in form and detail without departing from the scope of the disclosure and/or the appended claims.

The invention claimed is:

1. A method for controlling, from a first network, called a local network, at least one UPnP device of a remote network, the method being implemented by a first relay module of the first network, configured to communicate with at least a second relay module of the remote network, the method comprising:

obtaining, via said second relay module, at least one identifier of a UPnP device detected in said remote network by a remote UPnP control point of said remote network, said remote UPnP control point being associated with said second relay module, said at least one UPnP device identifier having been detected during a UPnP discovery phase in said remote network by said remote UPnP control point before its obtaining by the second relay module;

recording the at least one remote UPnP device identifier received in association with identification data of the second relay module that has supplied said at least one identifier;

receiving a remote UPnP device controlling request from a local user interface; and directly controlling the remote UPnP device of said remote network through the remote UPnP control point associated with the second relay module, identified by the identification data recorded in association with the identifier of this remote UPnP device, by sending to said second relay module the received controlling request without encapsulation of the controlling request.

2. The method as claimed in claim 1, further comprising:
receiving, through said second relay module, a response to said controlling request from the remote UPnP device.

3. The method as claimed in claim 1, further comprising
receiving, through the second relay module, a request intended for a UPnP device of the local network,
transmitting said request to the concerned UPnP device; and
transmitting, to said second relay module, a response to said request constructed from the response supplied by the UPnP device concerned.

4. The method as claimed in claim 3, further comprising recording, for at least one said second relay module, data representing an authorization to or prohibition from responding to a request originating from this second relay module.

5. The method as claimed in claim 2, further comprising, when a request or a response to a request, intended to be transmitted by the first relay module to one said second relay module, comprises an address of content referenced by a content server of the local network, converting this address into a converted address designating an interconnection module of a gateway for access to the local network as the entity from which this content is available.

6. The method as claimed in claim 2, further comprising, when a request or a response to a request, received by the first relay module and originating from one said second relay module, comprises an address of a content referenced by a content server of the remote network, converting this address into a converted address designating an interconnection module of a gateway for access to the local network as the entity from which this content is available.

7. The method as claimed in claim 1, further comprising
interrogating a UPnP control point of the local network in order to obtain at least one identification of a first UPnP device detected by this UPnP control point in the first network; and
recording the received identification in association with identification data identifying the first relay module as an entity via which the first UPnP device may be controlled.

8. The method as claimed in claim 7, further comprising creating a list of at least one UPnP device that may be controlled from the first relay module, comprising the received identifier(s) of one said second relay module or of one UPnP control point of the local network.

9. The method as claimed in claim 1, further comprising controlling a UPnP device of the local network through a UPnP control point of the local network.

10. The method as claimed in claim 1, further comprising recording identification data of at least one said second relay module of a remote network in association with an identifier of a contact, which is a user of this remote network.

11. A relay module of a first network configured to communicate with at least one second relay module of a remote network and comprising:
a processor; and
an information medium operably connected to the processor; and
a set of machine readable program instructions stored on the information medium and operable to cause the processor to perform a method, the method comprising:
obtaining, via one said second relay module, at least one identifier of a UPnP device detected in said remote network by a remote UPnP control point of said remote network, said remote UPnP control point being associated with said second relay module, said at least one UPnP device identifier having been detected during a UPnP discovery phase in said remote network by said remote UPnP control point before its obtaining by the second relay module;
recording the at least one remote UPnP device identifier received in association with identification data of the second relay module that has supplied said at least one identifier;
receiving a remote UPnP device controlling request from a local user interface; and
directly controlling the remote UPnP device of said remote network through the remote UPnP control point associated with the second relay module, identified by the identification data recorded in association with the identifier of this remote UPnP device, by relaying sending to said second relay module the received controlling request without encapsulation of the controlling request.

12. A relay module of a remote network configured to communicate with a first relay module of a first network, comprising:
a processor;
an information medium operably connected to the processor; and
a set of machine readable program instructions stored on the information medium and operable to cause the processor to perform a method, the method comprising:
supplying to said first relay module at least one identifier of a UPnP device detected in the remote network by a remote UPnP control point associated with said relay module, said at least one UPnP device identifier having been detected during a UPnP discovery phase in said remote network by said remote UPnP control point before its obtaining by the relay module of the remote network;
receiving a remote UPnP device controlling request directly from the first relay module in an unencapsulated form; and
controlling the UPnP device of said remote network based on the directly received unencapsulated request that originated from the first relay module.

* * * * *